US009004818B2

(12) United States Patent
Laborde et al.

(10) Patent No.: US 9,004,818 B2
(45) Date of Patent: Apr. 14, 2015

(54) SYSTEM, METHOD AND APPARATUS FOR SUBSEA INSTALLATION OF BUOYANCY MODULES

(75) Inventors: Lauren Elizabeth Laborde, Houston, TX (US); Charles E. Ruehl, Humble, TX (US); Edward Scott, Spring, TX (US); Mark K. Lane, Key Largo, FL (US)

(73) Assignee: Excelerate Energy Limited Partnership, The Woodlands, TX (US)

( * ) Notice: Subject to any disclaimer, the term of this patent is extended or adjusted under 35 U.S.C. 154(b) by 0 days.

(21) Appl. No.: 13/388,212

(22) PCT Filed: Jul. 29, 2010

(86) PCT No.: PCT/US2010/043703
§ 371 (c)(1),
(2), (4) Date: May 2, 2012

(87) PCT Pub. No.: WO2011/014651
PCT Pub. Date: Feb. 3, 2011

(65) Prior Publication Data
US 2012/0207547 A1 Aug. 16, 2012

Related U.S. Application Data

(60) Provisional application No. 61/230,606, filed on Jul. 31, 2009.

(51) Int. Cl.
*F16L 1/12* (2006.01)
*F16L 1/24* (2006.01)
(Continued)

(52) U.S. Cl.
CPC .................. *F16L 1/24* (2013.01); *E21B 17/012* (2013.01); *E21B 17/015* (2013.01); *F16L 1/20* (2013.01)

(58) Field of Classification Search
USPC ........... 405/158, 166, 171, 173, 184.1, 184.4; 441/4, 5
See application file for complete search history.

(56) References Cited

U.S. PATENT DOCUMENTS

| 4,231,226 A | 11/1980 | Griepentrog |
| 4,329,842 A | 5/1982 | Hoskinson |

(Continued)

FOREIGN PATENT DOCUMENTS

| CA | 2 267 969 | * 4/1999 | ............... F16L 1/24 |
| CA | 2267969 A1 | 10/2000 | |

(Continued)

OTHER PUBLICATIONS

Israel Patent Office, Communication regarding Israeli Patent Application No. 217620 entitled "System, Method and Apparatus for Subsea Installation of Buoyancy Modules," mailed Jul. 28, 2014, 4 pages.

*Primary Examiner* — Sean Andrish
*Assistant Examiner* — Patrick Lambe
(74) *Attorney, Agent, or Firm* — Frederic Dorwart, Lawyers; Penina Michlin Chiu

(57) ABSTRACT

Systems, methods and apparatuses for the installation or removal of buoyancy modules onto or from a submerged conduit are described herein. A system may include a buoyancy module (30), a control panel (76), an actuating means (72), and a clamp tool (40). The buoyancy module may include at least two sections. The clamp tool may hold the sections of the buoyancy module. The clamp tool (40) may include at least two plates (50, 52, 54, 56) that are actuated opened or closed using the control panel (76) and/or the actuating means (72) during attachment or removal of the buoyancy module (30) to the submerged conduit (10).

18 Claims, 11 Drawing Sheets

(51) Int. Cl.
*E21B 17/01* (2006.01)
*F16L 1/20* (2006.01)

(56) References Cited

U.S. PATENT DOCUMENTS

| 4,436,450 | A | | 3/1984 | Reed | |
|---|---|---|---|---|---|
| 4,563,108 | A | * | 1/1986 | Ayers | 405/171 |
| 5,074,712 | A | * | 12/1991 | Baugh | 405/158 |
| 6,767,165 | B1 | * | 7/2004 | Corbetta | 405/170 |
| 7,717,762 | B2 | | 5/2010 | Boatman et al. | |
| D649,641 | S | * | 11/2011 | Guttulsrud | D24/143 |

| 2005/0109513 | A1 | | 5/2005 | Dailey et al. | |
|---|---|---|---|---|---|
| 2008/0245933 | A1 | * | 10/2008 | Stokes | 248/74.1 |
| 2008/0286049 | A1 | * | 11/2008 | Eide | 405/171 |
| 2008/0289829 | A1 | * | 11/2008 | Bergeron et al. | 166/350 |
| 2009/0103984 | A1 | | 4/2009 | Zarisfi | |
| 2009/0272855 | A1 | * | 11/2009 | Oram | 248/67.5 |

FOREIGN PATENT DOCUMENTS

| EP | 1850044 A2 | 10/2007 |
|---|---|---|
| FR | 2894009 A1 | 6/2007 |
| GB | 1565323 | 4/1980 |
| GB | 2393426 | 3/2004 |

* cited by examiner

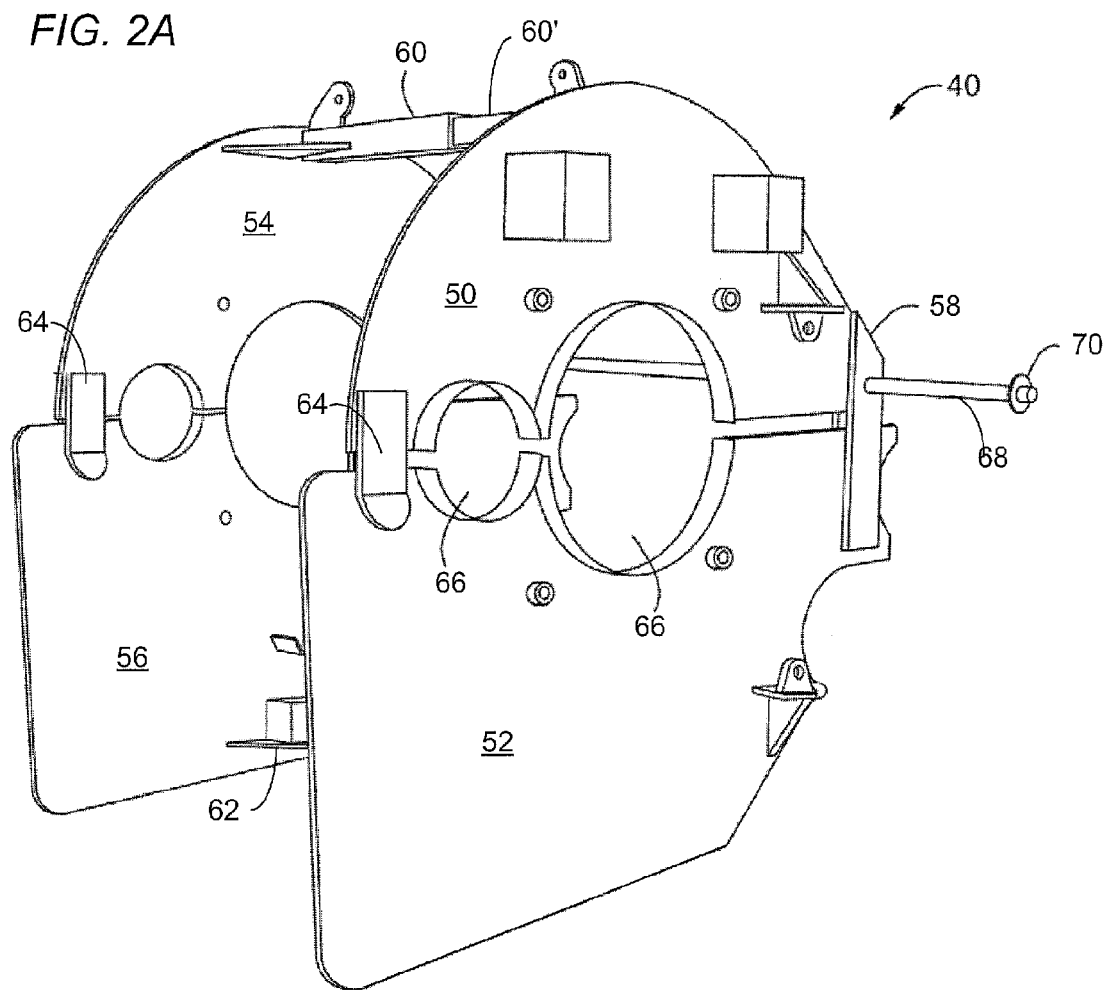

SYSTEM, METHOD AND APPARATUS FOR SUBSEA INSTALLATION OF BUOYANCY MODULES

BACKGROUND

1. Field of the Invention

Embodiments of the invention described herein pertain to the field of offshore oil and gas infrastructures. More particularly, but not by way of limitation, one or more embodiments of the invention enable a system, method and apparatus for subsea installation and removal of buoyancy modules.

2. Description of the Related Art

Oil and gas are often transported through pipelines on or beneath the ocean floor. These subsea pipelines are connected to onshore or offshore facilities for storage, processing or distribution of the oil and gas. Often, subsea pipelines connect to vessels or offshore platforms on the surface of the water through the use of submerged conduits, such as flexible risers, cables, umbilicals or steel catenary risers. The submerged conduits may carry oil, gas or other fluids or vapors to or from a pipeline end manifold or riser base. Submerged conduits may also be used to transfer oil or gas between a vessel or platform and an export tanker. The submerged conduits are usually maintained in a pre-defined geometric configuration such as an S-shape, lazy, steep, or pliant wave. Such configurations allow a vessel a full range of surface movement while it is connected to the conduit without placing excessive stress on the subsea lines, decouple wave movement from the seabed, and allow the submerged conduit to rise and lower without the possibility of kinks.

Submerged conduits maintain their configurations through the use of distributed buoyancy modules. Traditionally, buoyancy modules are installed on a conduit prior to its submersion under the water. However, buoyancy modules are often damaged after they are installed and after the conduit is already submerged. For example, buoyancy modules may be torn away from the submerged conduit or damaged in a collision. Accordingly, it is often desirable to remove or add a buoyancy module to a conduit after the conduit is already in place under water. Because buoyancy modules float and are difficult to handle under the water, present methods require that the submerged conduit be removed from the water in order to install or perform other maintenance on buoyancy modules, which is expensive, time consuming and undesirable.

For at least the limitations described above, there is a need for systems, methods and apparatuses for subsea installation or removal of buoyancy modules onto or from submerged conduits.

SUMMARY

One or more embodiments of the invention enable systems, methods and apparatuses for subsea installation and removal of buoyancy modules. In some embodiments, a method for subsea installation of buoyancy modules includes securing a buoyancy module to a clamp tool, positioning the clamp tool proximate to a submerged conduit, actuating the clamp tool around the submerged conduit, securing the buoyancy module to the submerged conduit, and releasing the clamp tool from the buoyancy module.

In some embodiments, a system for subsea installation of buoyancy modules includes a buoyancy module that includes at least two sections; a clamp tool, wherein the clamp tool holds the buoyancy module, wherein the clamp tool attaches the buoyancy module to a submerged conduit; a ram, wherein the ram actuates the clamp tool during attachment of the buoyancy module to the submerged conduit; and a control panel, wherein the control panel operates the clamp tool.

In some embodiments, a tool for subsea installation of a buoyancy module includes a plate with negative buoyancy, the plate configured to attach a buoyancy module to a submerged conduit; a means for actuating the plate; a flotation device configured to bring the plate to neutral buoyancy; and an interface, the interface being coupled to the actuating means.

In some embodiments, a method for subsea removal of buoyancy modules includes positioning a clamp tool proximate to a submerged conduit, wherein the submerged conduit includes a buoyancy module; actuating the clamp tool around the buoyancy module; securing the buoyancy module to the clamp tool; and removing the clamp tool from the submerged conduit.

In some embodiments, a method for installation of a buoyancy module, includes positioning a clamp tool proximate a portion of a submerged conduit, the clamp tool including a buoyancy module and an actuating means; actuating the clamp tool around the portion of the submerged conduit using the actuating means; securing the buoyancy module to the submerged conduit; and removing the clamp tool from the buoyancy module.

In some embodiments, a tool for subsea installation of a buoyancy module includes a plurality of plates with negative buoyancy, the plates configured to provide a buoyancy module to a portion of a submerged conduit; a fastener, the fastener configured to secure the at least a portion of the buoyancy module to at least one plate of the plurality of plates; a means for actuating at least a first plate of the plurality of plates apart from at least a second plate of the plurality of plates; and a flotation device configured to bring the plates to neutral buoyancy.

In some embodiments, a system for subsea installation of a buoyancy module includes one or more clamp tools. In some embodiments, a method for subsea installation and/or or removal of one or more buoyancy modules includes positioning or removing one of the buoyancy modules using the systems, tools, and/or methods described herein.

BRIEF DESCRIPTION OF THE DRAWINGS

The above and other aspects, features and advantages of the invention will be more apparent from the following more particular description thereof, presented in conjunction with the following drawings wherein:

FIG. 2A illustrates a perspective of a side view of an embodiment of a clamp tool.

Figure 1:
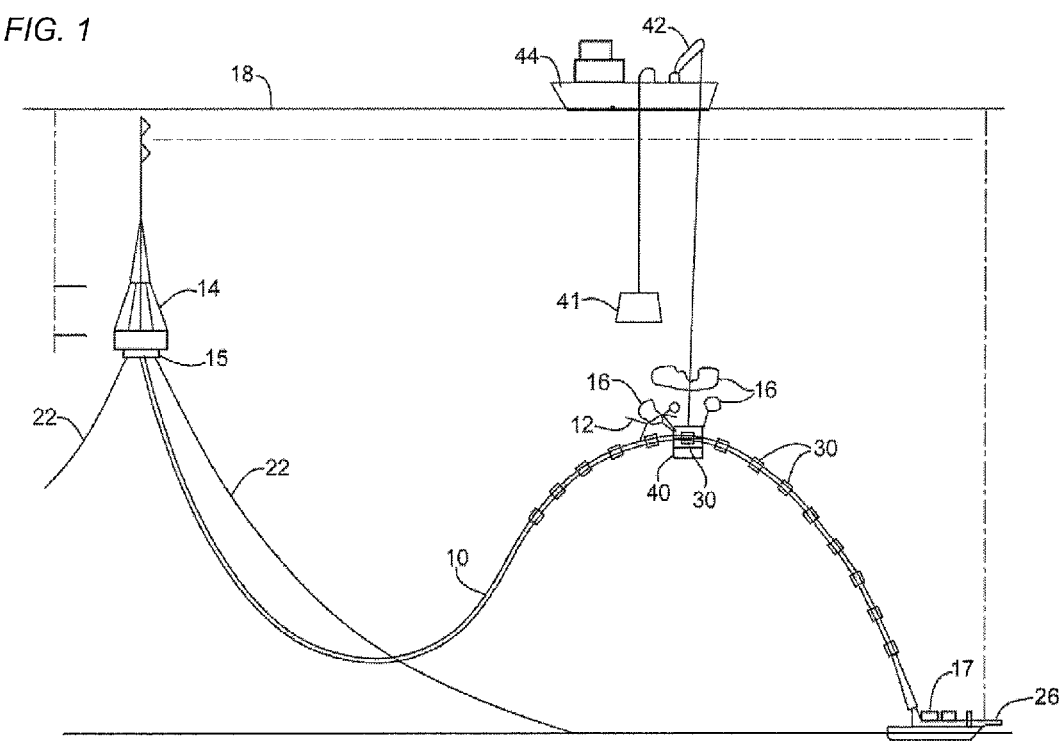
FIG. 1 illustrates a schematic of an embodiment of a system to install buoyancy modules onto submerged conduits that includes a clamp tool.

While the invention is susceptible to various modifications and alternative forms specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Systems, methods and apparatuses for subsea installation and/or removal of buoyancy modules are described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Although examples of the invention are set forth herein, the claims, and the full scope of any equivalents, are what define the metes and bounds of the invention.

"Buoyancy" refers to the upward force exerted on a body floating or immersed in a fluid. "Negative buoyancy" refers to where the weight of a body is greater than the weight of an equal volume of the fluid. "Neutral buoyancy" refers to when the weight of a body is equal to the weight of an equal volume of the fluid.

"Coupled" refers to either a direct connection or an indirect connection (for example, at least one intervening connection) between one or more objects or components.

As used in this specification, the singular forms "a", "an" and "the" include plural referents unless the content clearly indicates otherwise. Thus, for example, reference to a system for subsea installation of a buoyancy module including "a ram," includes a single ram or two or more rams.

Using the systems and methods described herein, buoyancy modules may be installed on submerged conduits and/or removed from submerged conduits. In some embodiments, a clamp tool is used to install the buoyancy modules. In certain embodiments, the clamp tool is hydraulically actuated.

FIG. 1 depicts a schematic of an embodiment of a system to install buoyancy modules onto submerged conduits that comprises a clamp tool. Submerged conduit 10 is coupled to docking buoy 14 and subsea manifold 17. Submerged conduit 10 may be one or more of a flexible riser, a pipeline, an umbilical, a steel catenary riser, a steel export riser, a cable, chain, rope, or any other conduit capable of accommodating a buoyancy module. In certain embodiments, submerged conduit 10 may comprise two parallel conduits, such as a flexible riser to transport gas and an umbilical to control subsea equipment. Submerged conduit 10 may be below water surface 18. In some embodiments, docking buoy 14 may be pulled into and secured to the bottom of a vessel and may include a pickup line to the surface to enable connections between docking buoy 14 and a vessel. In some embodiments, docking buoy 14 may include turret 15 which couples docking buoy 14 to anchor lines 22 and submerged conduit 10. In certain embodiments, docking buoy 14 may include an outer hull which is configured to rotate around turret 15 when docking buoy 14 is connected to a vessel. Such a system allows a vessel to weather vane around docking buoy 14 without the aid of propulsion. Oil, gas, other liquids or vapors may be transferred through submerged conduit 10 to and/or from docking buoy 14. In certain embodiments, submerged conduit 10 may include hydraulic cables and/or wires to transmit information between docking buoy 14 and/or a vessel connected to docking buoy 14 and subsea manifold 17. In some embodiments, docking buoy 14 may be an offshore platform, a vessel, a dock or an onshore facility. In some embodiments, subsea manifold 17 may contain piping and/or valves to couple submerged conduit 10 to subsea pipeline 26 and control the fluid flow through submerged conduit 10 and subsea pipeline 26. Controls for the valves may be located on a vessel, offshore platform, dock, onshore facility or docking buoy 14. In certain embodiments, subsea manifold 17 may be a pipeline end manifold, riser base, or export tanker.

Buoyancy module 30 may be installed and/or located on submerged conduit 10 and is well known to those of skill in the art. Buoyancy module 30 allows submerged conduit 10 to remain in a stable catenary configuration, S-shape, pliant, lazy or steep wave, or other geometric configuration. Geometric configurations permit submerged conduit 10 to handle water, current and vessel movement without sustaining unnecessary stress or the possibility of kinks. In some embodiments, buoyancy module 30 is circular or cylindrical in shape, but other shapes are also contemplated. In certain embodiments, buoyancy module 30 is a buoyancy module inner clamp. Buoyancy module 30 may split into two or more sections in order to permit installation onto submerged conduit 10. Flotation Technologies of Biddenford, Me. and Trelleborg Offshore of Trelleborg, Sweden supply suitable buoyancy modules.

Clamp tool 40 may be used to install buoyancy module 30 onto submerged conduit 10. In some embodiments, clamp tool 40 may be lowered into a position proximate submerged conduit 10 using crane 42 located on vessel 44. Vessel 44 may be a dive vessel, barge, dock, or any other platform located a suitable distance from submerged conduit 10. In some embodiments, crane 42 may have a rated capacity sufficient to lift and maneuver the weight of clamp tool 40 and may be located on the deck of vessel 44. In certain embodiments, a rigging may be used to secure crane 42 to a top portion of clamp tool 40. In some embodiments, multi-part riggings may be used. The rigging may include slings, a crane hook and chain corn-a-longs. Vessel 44 may include personnel, crane 42, hydraulic equipment, communication equipment and/or video equipment to monitor the underwater activity during installation of buoyancy module 30. In some embodiments, dive bell 41 may also be connected to vessel 44. Clamp tool 40 may be further positioned in the water by divers 12, a remotely operated vehicle or a propulsion system. The propulsion system may be an electric propulsion system, or any other propulsion system able to function under water and well known to those of skill in the art. In some embodiments, a remotely operated vehicle may monitor operations of clamp tool 40.

In some embodiments, clamp tool 40 has negative buoyancy. When clamp tool 40 reaches the desired depth for installation of buoyancy module 30, one or more flotation devices 16, such as lift bags or float bags, may be used to bring clamp tool 40 to a neutral buoyancy point. In certain embodiments, multiple flotation devices may be used. Bringing clamp tool 40 to a neutral buoyancy point allows for ease of movement of clamp tool 40 and shifts the load from crane 42 to flotation device 16. In some embodiments, flotation device 16 may be installed on clamp tool 40. In some embodiments, an air manifold for inflating flotation device 16 may be located on clamp tool 40. Flotation device 16 may be rolled and tied prior to submersion of clamp tool 40 to prevent fouling and accidental inflation prior to reaching the desired depth. Tubing may connect the air manifold and flotation device. In certain embodiments, about four 1000 lb (about 454 Kg) lift bags may be used on a top portion of clamp tool 40.

Figure 2B:
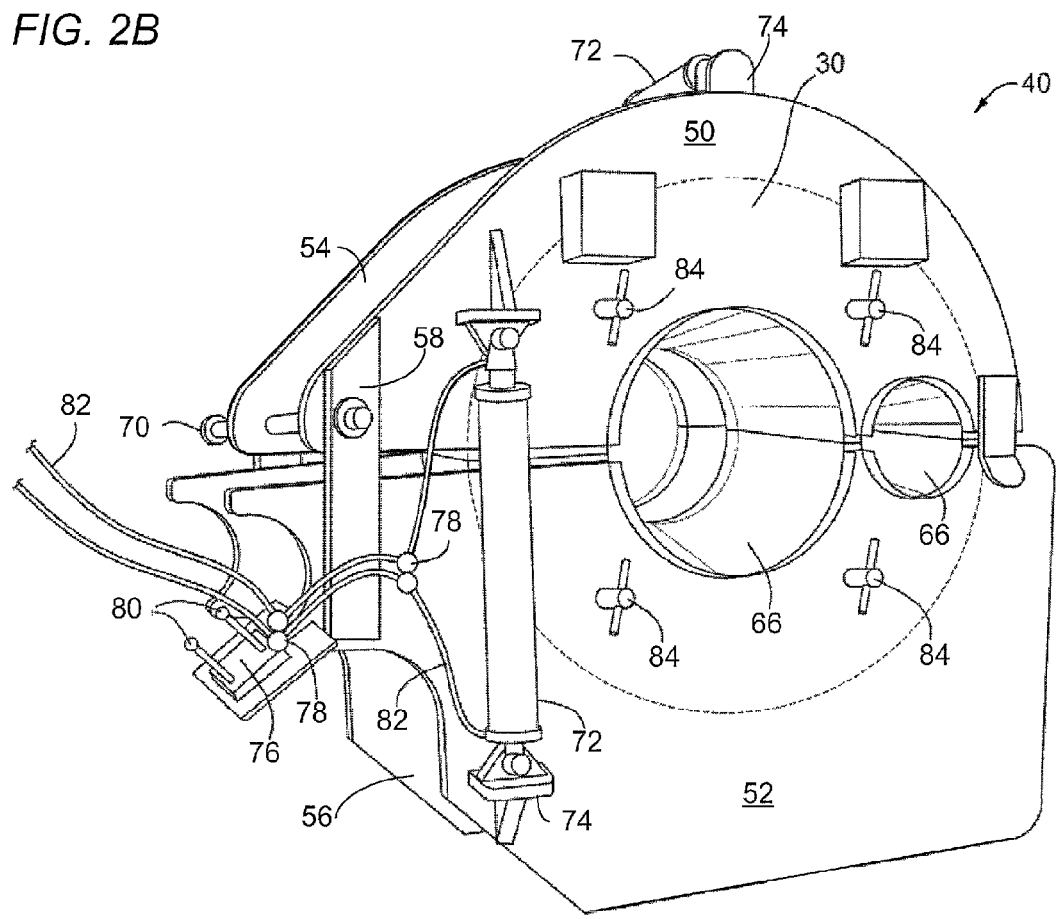
FIG. 2B illustrates a perspective of a side view of an embodiment of a clamp tool with a buoyancy module attached.
Figure 2C:
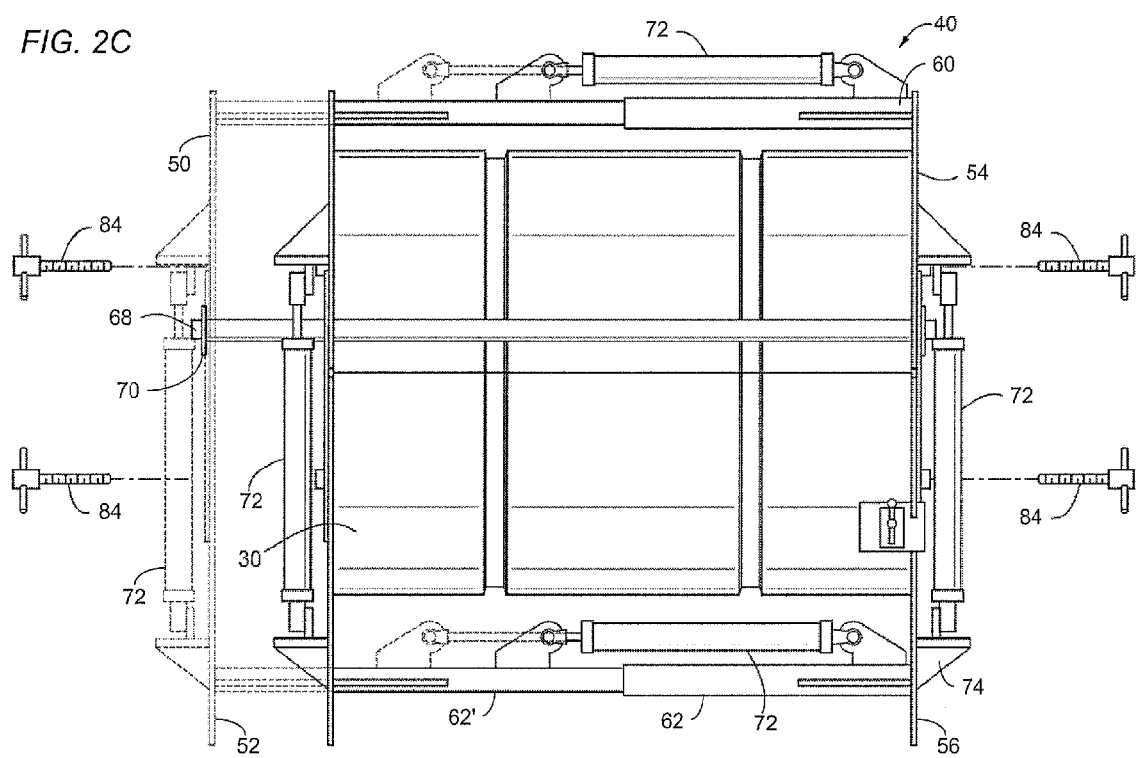
FIG. 2C illustrates a schematic of a top view of an embodiment of a clamp tool with a portion of a clamp tool moving outward.
Figure 2D:
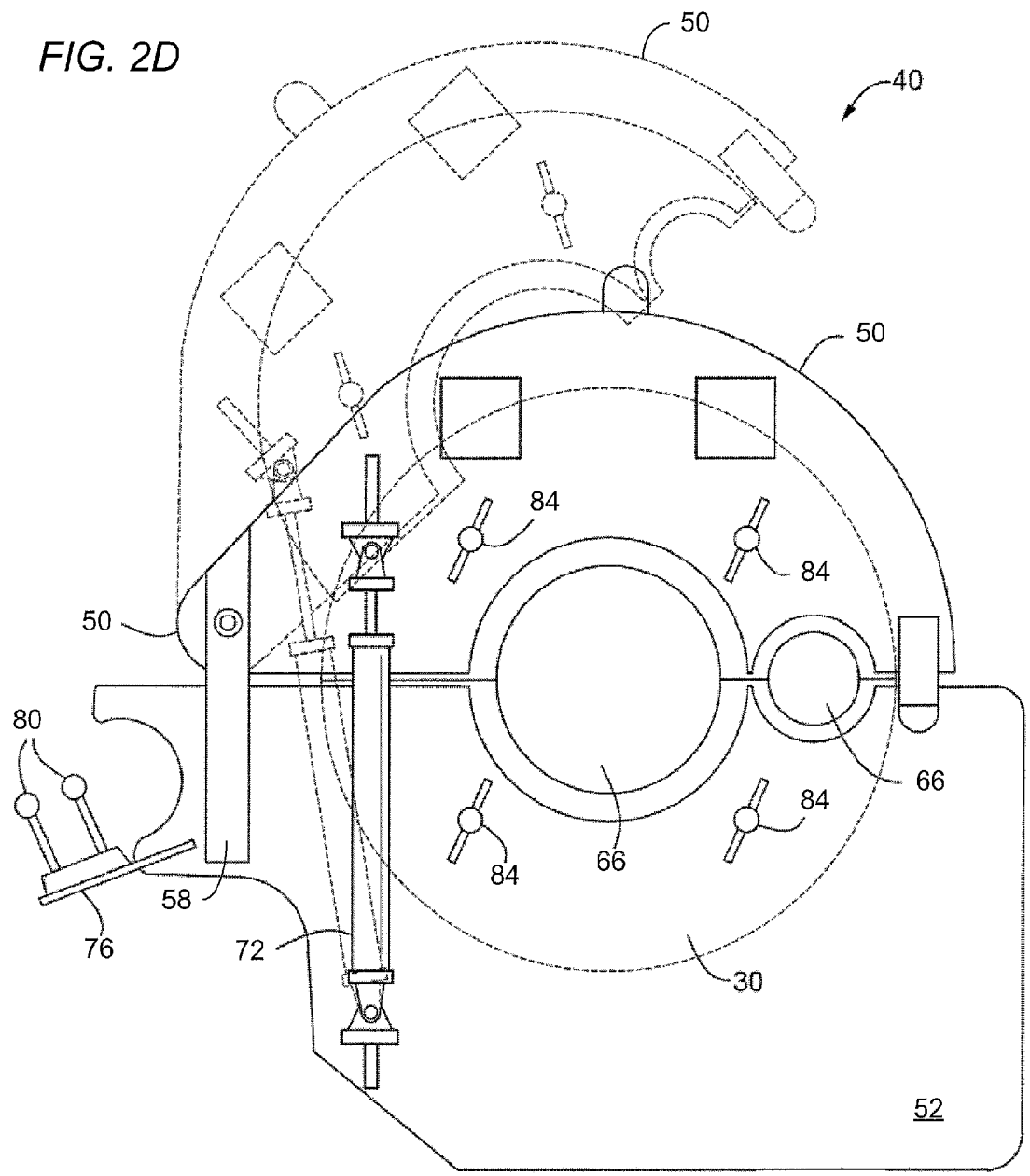
FIG. 2D illustrates a schematic of a side view of an embodiment of a portion of a clamp tool moving upward.
Figure 2E:
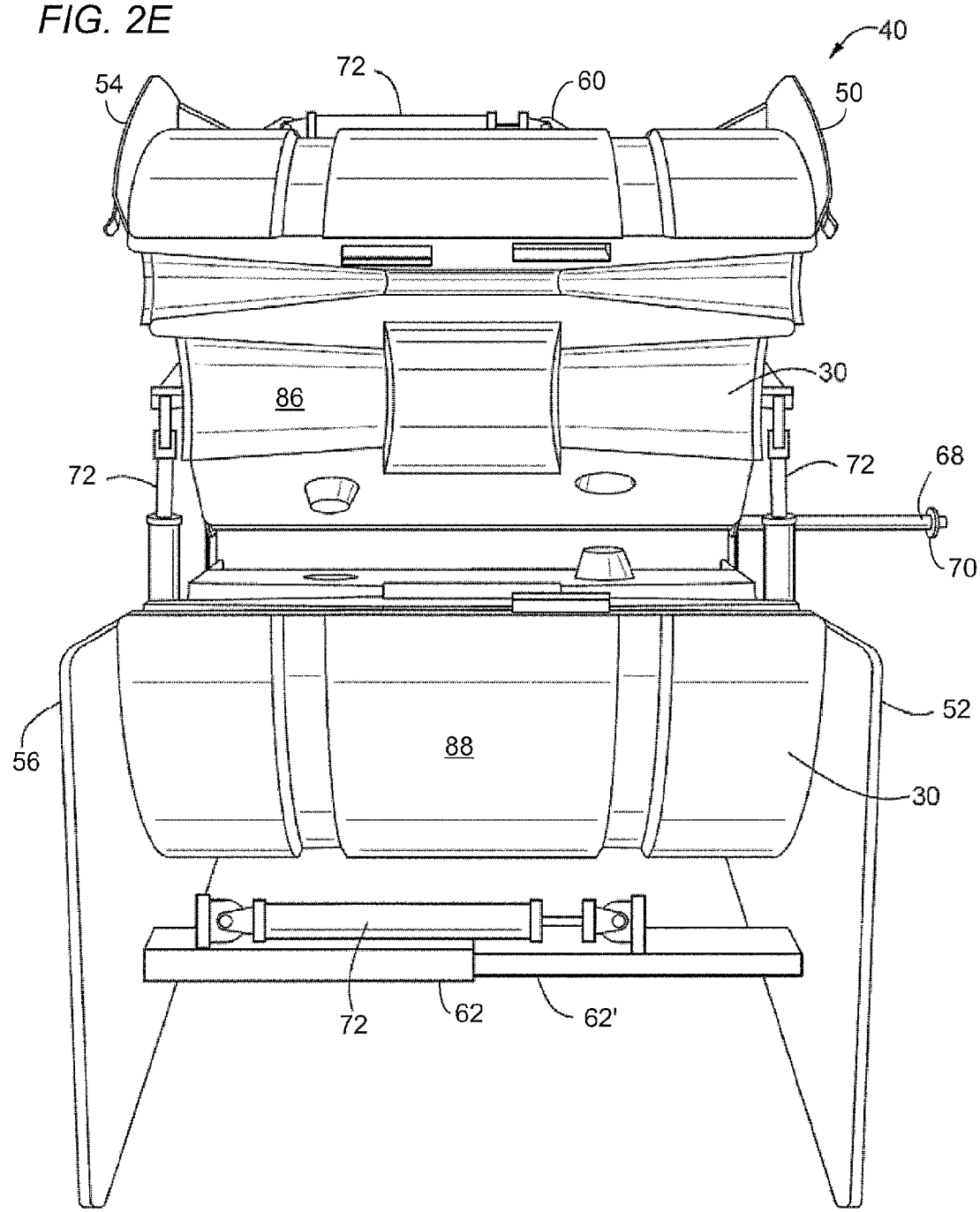
FIG. 2E illustrates a perspective of a front view of an embodiment of an opened clamp tool.

FIGS. 2A through 2E illustrate embodiments of a clamp tool and systems that include the clamp tool. FIG. 2A illustrates a perspective of a side view of an embodiment of a clamp tool. FIG. 2B illustrates perspective of a side view of an embodiment of a clamp tool with a buoyancy module attached. FIG. 2C illustrates a schematic of a top view of an embodiment of a clamp tool with a portion of the clamp tool moving outward. FIG. 2D illustrates a schematic of a side view of an embodiment of a portion of the clamp tool moving upward. FIG. 2E illustrates a perspective of a front view of an embodiment of a clamp tool actuated open. Clamp tool 40 may include one or more plates that are coupled together to allow opening and closing of the clamp tool. The ability to adjust the plates allows accommodation of various sizes of buoyancy modules and the ability to position the clamp tool around a buoyancy module or to remove a buoyancy module from a clamp tool.

As shown in FIG. 2A, clamp tool 40 includes first plate 50, second plate 52, third plate 54, fourth plate 56, first connecting bar 60, second connecting bar 62, and hinges 58 (pivots). Hinges 58 couple first plate 50 to second plate 52 and third plate 54 to fourth plate 56. First connecting bar 60 may connect first plate 50 to third plate 54. Second connecting bar 62 may connect second plate 52 to fourth plate 56. Connection of first and second connecting bars 60, 62 and hinges 58 to first plate 52, second plate 54, third plate 56, and fourth plate 58 may be done using methods known in the art such as welding, screwing, bolting, or the like.

First plate 50, second plate 52, third plate 54, and/or fourth plate 56 may be shaped to allow one or more openings (cavities) 66 to be formed when the clamp tool 40 is in a closed position. Openings 66 may be sized to accommodate conduits. For example, openings 66 may have diameters greater than submerged conduit 10 to allow buoyancy module 30 and/or clamp tool 40 to surround submerged conduit 10. First plate 50, second plate 52, third plate 54, and/or fourth plate 56 may also be shaped (for example, curved or include handles) to allow cranes and/or other deployment equipment to couple to the clamp tool.

First plate 50 and third plate 54 may pivot on hinges 58 in order to move the plates apart or together. For example, first plate 50 and third plate 54 may pivot on hinges 58 in an upward motion or a downward motion relative to second plate 52 and fourth plate 56. Such motion may open and close the clamp tool. In some embodiments, second plate 52 and fourth plate 56 may pivot on hinges 58 in order to move the plates in an upward and a downward motion relative to first plate 50 and third plate 54. In some embodiments, actuating third plate 54 and fourth plate 56 opens and closes clamp tool 40. First plate 50 and second plate 52 may couple to third plate 54 and fourth plate 56 using one or more latching elements 64. In some embodiments, latching elements 64 are omitted.

First connecting bar 60 and second connecting bar 62 may include members 60', 62' that telescope. First connecting bar 60 and second connecting bars 62 and telescoping members 60', 62' (shown in FIG. 2C) may be any shape (for example, cylindrical, square, or round), length or diameter. First connecting bar 60, second connecting bar 62, telescoping member 60', telescoping member 62', or combinations thereof may include one or more flanges and/or openings that allow flotation devices, hooks, cranes, rigging, or other materials to be attached to the clamp tool. Extending or retracting telescoping members 60', 62' from first and second connecting bars 60, 62 may move first plate 50, second plate 52, third plate 54, and/or fourth plate 56 outward and/or inward. First plate 50 and third plate 54 may move along rod 68 until reaching stops 70. Stops 70 may limit the outward and/or inward movement of one or more of the plates. Stops 70 may be adjustable to allow a width of clamp tool 40 to be varied. In some embodiment, rod 68 may be coupled to second plate 52 and fourth plate 56, and the plates may move along rod 68 until reaching stops 70.

In some embodiments, clamp tool 40 may include one or more pressurized systems that provide force to move plates and/or connecting bars of clamp tool 40. As shown in FIGS. 2B-2E, clamp tool 40 includes rams 72. Rams 72 may be located on first plate 50, second plate 52, third plate 54, fourth plate 56, first connecting bar 60, second connecting bar 62, telescoping members 60', 62' or combinations thereof. Rams 72 may be removably coupled to the plates, telescoping members and/or connecting bars to allow replacement and/or maintenance of the rams. As shown in FIG. 2B-2E, rams 72 are positioned in holders 74 located on two plates (for example, first plate 50 and second plate 52) to allow one ram to be positioned on both plates. In some embodiments, holders 74 are positioned on a single plate. Rams 72 may also be positioned in holders 74 on first connecting bar 60 and second connecting bar 62. Rams 72 may be positioned on the plates, telescoping members and/or connecting bars using any method know in the art and/or in any position suitable to provide force for movement of plates, telescoping and/or connecting members. Rams 72 may use hydraulic fluid or air as a source of compressible fluid. Actuation of rams 72 on first connecting bar 60 and second connecting bar 62 move first plate 50, second plate 52, third plate 54, and fourth plate 56 apart and together (inwards and outwards) to open and close clamp tool 40. As shown in FIG. 2C, actuation of rams 72 on first connecting bar 60 and second connecting bar 62 move first plate 50 and second plate 52 away (outwards) from third plate 54 and fourth plate 56. Moving the plates apart or together may allow adjustment of the width of the clamp tool so that buoyancy modules of various sizes may be used, and/or allow easy attachment, removal or adjustment of buoyancy modules used with the clamp tool. For example, actuation of rams on one or more plates may move one or more plates upwards or downwards to open and close clamp tool 40. As shown in FIG. 2D, actuation of rams 72 on first plate 50, second plate 52, third plate 54, and fourth plate 56 move first plate 50 and third plate 54 upwards (open) relative to second plate 52 and fourth plate 56. Moving the plates upward and downwards may assist in attaching a buoyancy module to clamp to 40, positioning the buoyancy module on a submerged conduit and/or removing a buoyancy module from a submerged conduit.

Rams 72 may include, but are not limited to, air pumps, air cylinders and/or hydraulic fluid cylinders. Rams 72 may be sized to accommodate the size of clamp tool 40, the size of submerged conduit 10, and/or the amount of pressure needed to move first plate 50, second plate 52, third plate 54, and/or fourth plate 56 of clamp tool 40 to the desired positions, (for example, upward, downward, inward and/or outward). For example, rams 72 may be of sufficient size to actuate clamp tool 40 around submerged conduit 10. In some embodiments, one or more of rams 72 may be of the same size. In certain embodiments, rams 72 on first plate 50, second plate 52, third plate 54, and fourth plate 56 are smaller or larger than rams 72 located on first connecting bar 60 and/or second connecting bar 62. Rams 72 are well known to those of skill in the art. For example, rams 72 may be air or hydraulic fluid rams obtained from Monarch Industries, Manitoba, Canada.

Clamp tool 40 may include or be coupled to one or more automatic (for example, one or more computers) or manual operating systems used to control operation and/or positioning of clamp tool 40. Automatic operating systems may include one or more programmable interfaces. As shown in FIG. 2B and FIG. 2D, clamp tool 40 includes control panel 76. In some embodiments, control panel 76 may include an interface, manifold valves 78 and/or or levers 80. Manifold valves 78 may be hydraulic or air valves and may be controlled by levers 80. Manifold valves 78 may be located on control panel 76 and/or on other components of clamp tool 40. In some embodiments, control panel 76 may be located on hinges 58, or on another portion of clamp tool 40. In certain embodiments, control panel 76 may be located remotely from clamp tool 40. In some embodiments, control panel 76 may be located on a floating and/or stationary unit located at the surface of the water (for example, vessel 44 in FIG. 1, a barge, a platform, a dock, or onshore). In some embodiments, control panel 76 may include one or more valves and/or manifolds, such as manifold valve 78, for opening and closing clamp tool 40, for adjusting the width of clamp tool 40, and/or to control the propulsion system or other motions of clamp tool 40.

High pressure hoses 82 may connect first plate 50, second plate 52, third plate 54, and fourth plate 56, hinges 58, control panel 76, and/or rams 72 to a floating and/or stationary unit located at the surface of the water (for example, vessel 44 in FIG. 1, a barge, and/or a dock). When clamp tool 40 includes air actuated systems (for example, air actuated rams 72), an amount of air in high pressure hoses 82 may be used to adjust of the buoyancy of clamp tool 40. One or more pumps may pump air or hydraulic fluid through high pressure hoses 82. High pressure hoses 82 and/or manifold valves 78 connect rams 72 to control panel 76 and one or more pumps (not shown). In some embodiments, the pump(s) may be activated on a remote unit (for example, vessel 44 in FIG. 1). The pump(s) may be located on a remote unit (for example, vessel 44 in FIG. 1, or on a remotely operated vehicle) or may be located on clamp tool 40. One or more high pressure hose couplings may be used to connect the high pressure hoses the clamp tool, control panel, rams, pumps, or combinations thereof.

Clamp tool 40 and equipment associated with the clamp tool (for example, rams, control panel, hoses, valves, and the like) may be made out of any other material able to withstand and operate under seawater conditions. Examples of materials able to withstand and operate under seawater conditions include, but are not limited to, titanium, metals, composites, alloys, ceramic, plastic, biomaterials, steel, or combinations thereof. Examples of steel include, but are not limited to, stainless steel, carbon and alloy steel, high strength low alloy steel, or any grade of steel able to withstand and operate under seawater conditions any depth where a submerged conduit may be located. In some embodiments, clamp tool 40 includes A36 ½" steel. Clamp tool 40 may be any size sufficient to accommodate one or more buoyancy modules. In some embodiments, clamp tool 40 has height and width dimensions of about 1'×about 4' (about 30.5 cm×about 122 cm), from about 7'×about 8' (about 213 cm×about 243 cm), or from 10'×about 11' (about 305 cm×about 335 cm). In some embodiments, clamp tool 40 is about 7 feet 7 inches (about 234.14 cm) tall and about 8 feet (about 243.84 cm) wide. Smaller and larger sizes for clamp tool 40 are also contemplated.

Clamp tool 40 may accommodate one or more sections of one or more buoyancy modules 30 between first plate 50, second plate 52, third plate 54, and fourth plate 56. FIGS. 2B-E show embodiments of buoyancy module and/or sections of buoyancy module 30 between first plate 50, second plate 52, third plate 54, and fourth plate 56. As shown in FIG. 2B, buoyancy module 30 is positioned in the interior of clamp tool 40. Depending on the size of buoyancy module 30, first plate 50, second plate 52, third plate 54, and fourth plate 56 or combinations thereof may be moved upward, downwards, inwards, and/or outwards to accommodate sections of buoyancy module 30 and/or the buoyancy modules during placement or removal of the buoyancy module in the clamp tool. For example, actuation of rams 72 on first connecting bar 60 and second connecting bar 62 move first plate 50 and second plate 52 away (outwards) from third plate 54 and fourth plate 56 to accommodate sections of buoyancy modules 30.

Once in place, at least a portion of buoyancy module 30 and/or sections of the buoyancy module may be secured to first plate 50, second plate 52, third plate 54, and/or fourth plate 56 by at least one of fasteners 84. Fasteners 84 may hold sections of buoyancy module 30 in place before it is installed on submerged conduit 10. In some embodiments, fasteners 84 may be removable fastenings, such as pin screws, jackscrews, T-Handle bolts, locking brackets, bracing straps, welded bracing clips, or any suitable removable fastening means. In some embodiments, fasteners 84 are not necessary. FIG. 2E depicts a front view of buoyancy module 30 secured to clamp tool 40. First section 86 of buoyancy module 30 may be positioned between first plate 50 and third plate 54 and second section 88 of buoyancy module 30 may be positioned between second plate 52 and fourth plate 56.

In some embodiments, buoyancy module 30 may include a buoyancy module inner clamp. Buoyancy module 30 may include grooves that allow a buoyancy module inner clamp and/or sections of a buoyancy module inner clamp to reside in one or more sections of buoyancy module 30. For example, a buoyancy module inner clamp and/or sections of a buoyancy module inner clamp may be nested inside buoyancy module 30. In some embodiments, a buoyancy module inner clamp is secured to buoyancy module 30. During installation, buoyancy module 30 may close around the buoyancy module inner clamp. In some embodiments, the buoyancy module inner clamp closes around submerged conduit 10 while buoyancy module 30 closes around the buoyancy module inner clamp. In other embodiments, buoyancy module 30 is a buoyancy module inner clamp.

In some embodiments, buoyancy module 30 is secured to clamp tool 40 prior to submersion. For example, buoyancy module 30 may be secured to clamp tool 40 on a dive vessel, a floating barge, a dock, or onshore, and then loaded onto another vessel for deployment or deployed directly from the dive vessel, floating barge and/or dock. Once buoyancy module 30 is secured in clamp tool 40, the clamp tool may be positioned proximate submerged conduit 10 below water surface 18. In some embodiments, flotation devices 16 may be attached to clamp tool 40. Clamp tool 40 may be positioned by crane 42, divers and/or its own propulsion system well known to those of skill in the art. For example, a crane may be connected to first connecting bar 60 and/or clamp tool 40, and clamp tool 40 may be lowered into the water.

Figure 3A:
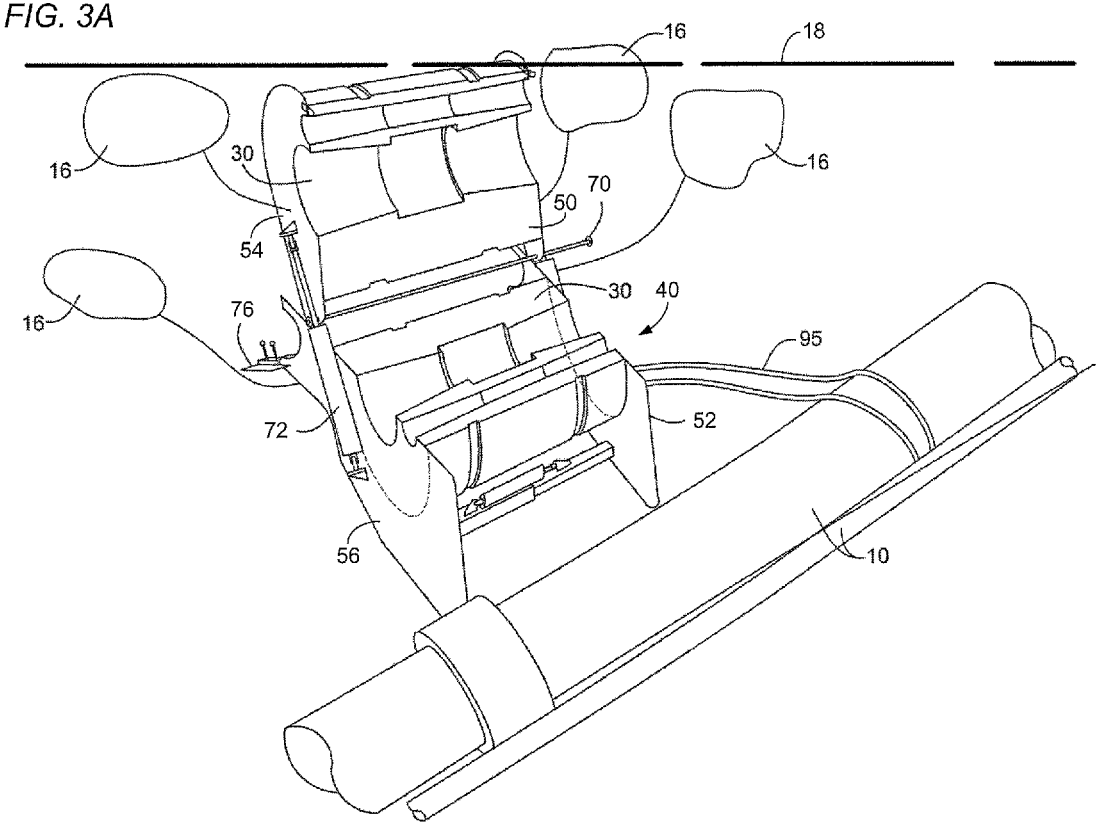
FIG. 3A illustrates a schematic of an embodiment of an opened clamp tool proximate a submerged conduit.

Clamp tool 40 may be in a closed or opened positioned while positioning the clamp tool proximate submerged conduit 10. In some embodiments, clamp tool 40 may be in a closed configuration while it is positioned proximate to submerged conduit 10. Once in position, in certain embodiments, clamp tool 40 may be opened using rams 72 and/or control panel 76. FIG. 3A depicts a schematic of positioning an opened clamp tool 40 proximate submerged conduit 10 below water surface 18. Flotation devices 16 connected to clamp tool 40 may assist in maintaining the desired buoyancy of clamp tool 40.

Securing straps 95 may secure clamp tool 40 to submerged conduit 10. For example, choker straps may be secured on submerged conduit 10 about six feet from either side of clamp tool 40. In some embodiments, securing straps 95 are not necessary. In certain embodiments, divers may use chain falls or another gear reduction assembly to hold clamp tool 40 in place while clamp tool 40 is being closed around and/or coupled to submerged conduit 10.

Figure 3B:
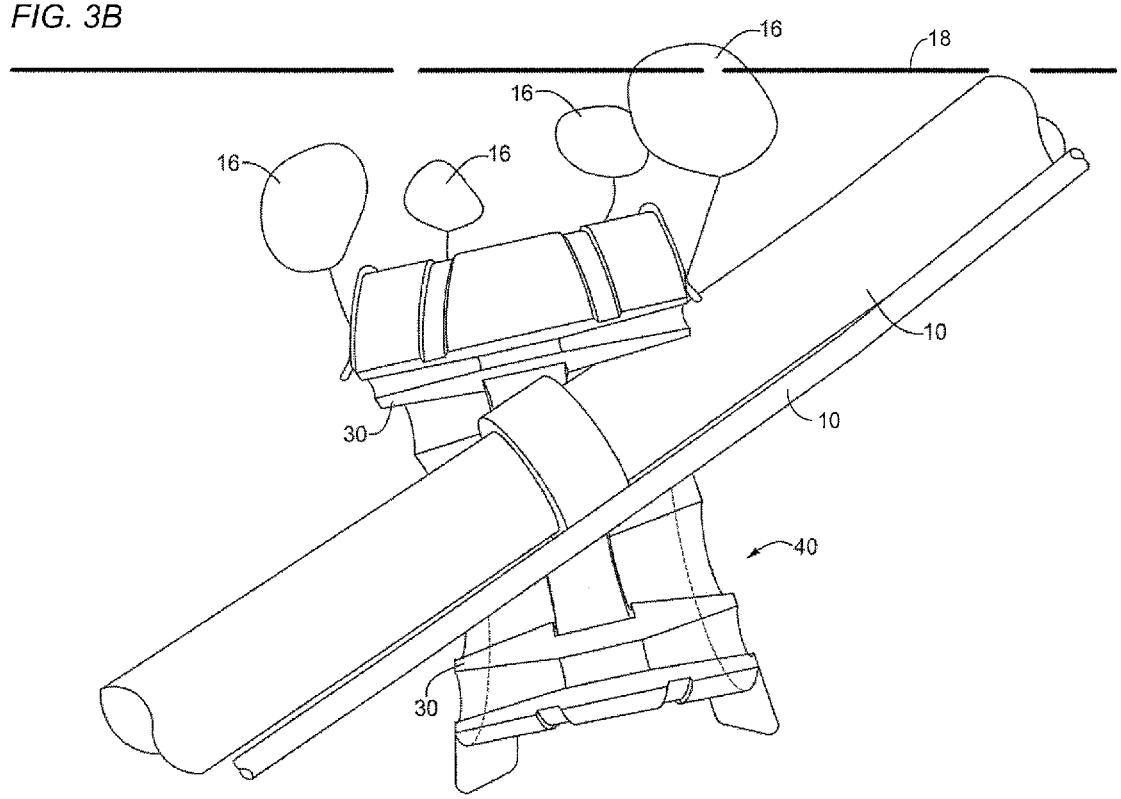
FIG. 3B illustrates a schematic of an embodiment of an opened clamp tool positioned around a submerged conduit.
Figure 3C:
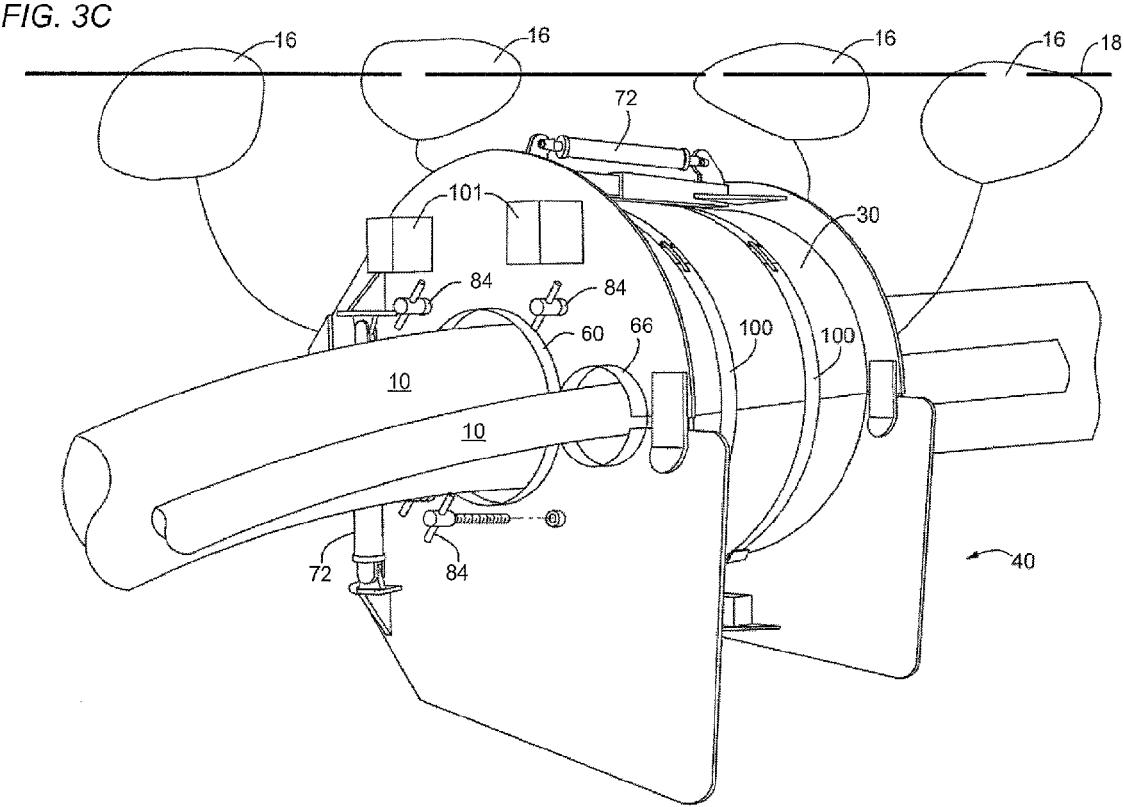
FIG. 3C illustrates a schematic of an embodiment of a clamp tool actuated closed around a submerged conduit.

Clamp tool 40 may be actuated to wholly or partially close clamp tool 40 to allow one or more sections of buoyancy modules 30 and/or one or more of the buoyancy modules to wholly or partially surround submerged conduit 10. FIG. 3B depicts a schematic of clamp tool 40 in a partially closed positioned around submerged conduits 10. FIG. 3C depicts a schematic of clamp tool 40 and buoyancy module 30 fully surrounding submerged conduits 10. In certain embodiments, clamp tool 40 and/or buoyancy module 30 may attach to submerged conduit 10 without the need for the clamp tool 40 to close around the submerged conduit.

Buoyancy module 30 may then be secured in place on submerged conduit 10. Buoyancy module 30 may be connected to submerged conduit 10 using connecting straps 100. Connecting straps 100 may be made of synthetic fibers (for example, Kevlar, a registered trademark of E. I. du Pont de Nemours and Company) stainless steel, or any other suitable connector. Connection of connecting straps 100 to conduit 10 may be accomplished by a diver, robotic equipment or by mechanical means. Once buoyancy module 30 is connected to submerged conduit 10, fasteners 84 may be removed, as shown in FIG. 3C. Fasteners 84 and other equipment may be stored in toolbox 101 located on clamp tool 40. For example, divers and/or robotic equipment may remove fasteners 84 from clamp tool 40 and place the fasteners in toolbox 101. When buoyancy module 30 is connected to submerged conduit 10, clamp tool 40 may be removed.

Figure 3D:
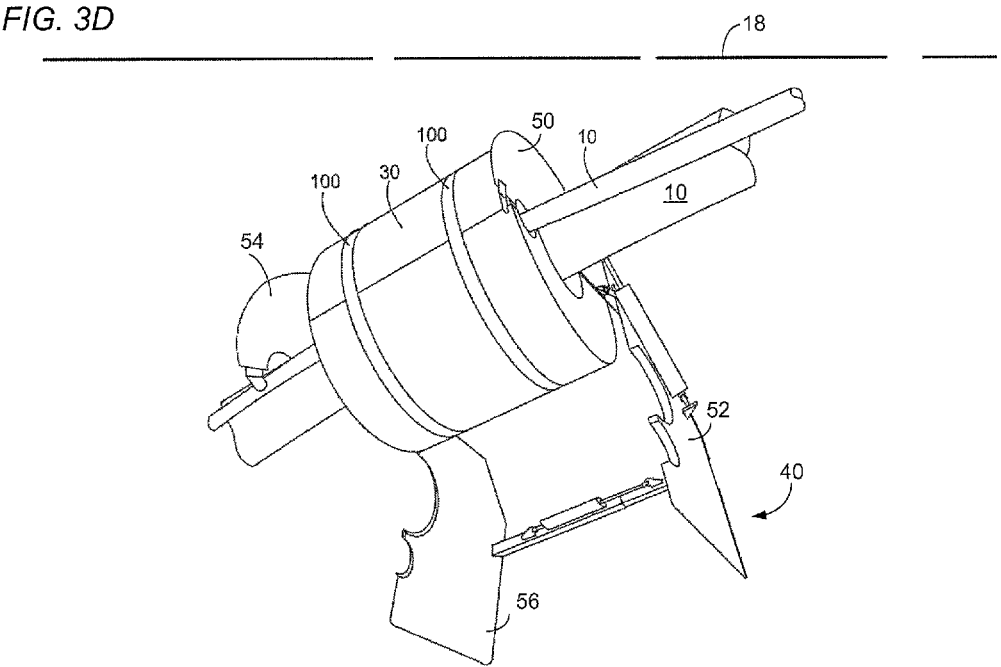
FIG. 3D illustrates a schematic of an embodiment of a clamp tool released from a submerged conduit after attachment of a buoyancy module.

FIG. 3D illustrates a schematic of an embodiment of a clamp tool being released from a submerged conduit after attachment of a buoyancy module. In certain embodiments, clamp tool 40 may be removed by moving first plate 50, second plate 52, third plate 54, and/or fourth plate 56 outwards or apart by actuation of one or more rams 72. In some embodiments, moving first plate 50, second plate 52, third plate 54, and/or fourth plate 56 outwards clears the edges of clamp tool 40 away from submerged conduit 10. First plate 50, second plate 52, third plate 54, and/or fourth plate 56 may be moved (actuated) outwards with rams 72 located on first connecting bar 60 and second connecting bar 62 and/or telescoping members 60', 62'. As shown, second plate 52 and fourth plate 56 may be moved downward relative to first plate 50 and third plate 54, and third plate 54 and fourth plate 56 may be moved outwards to open clamp tool 40.

Figure 3E:
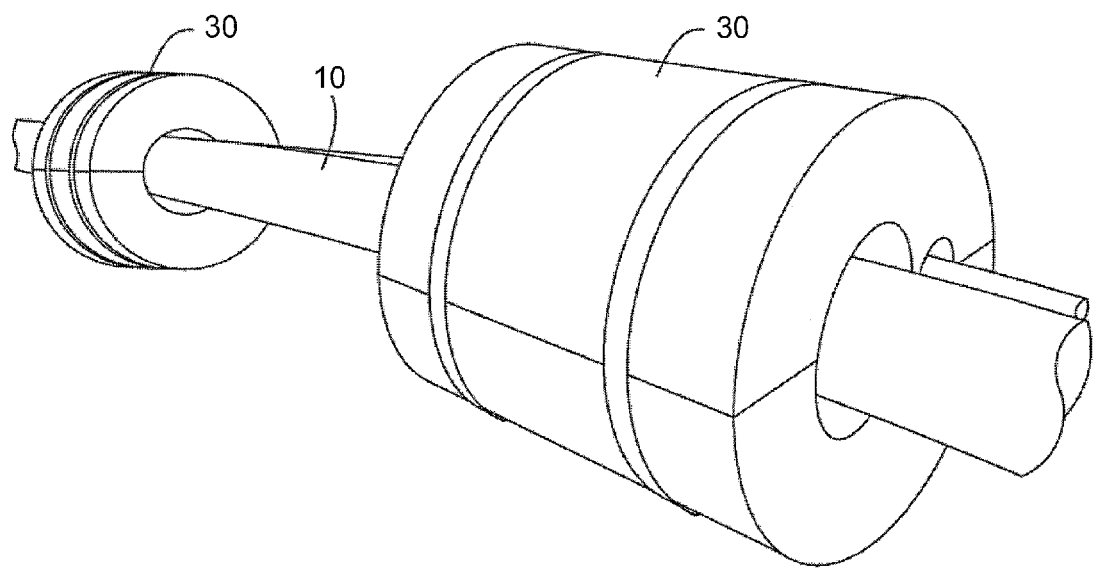
FIG. 3E illustrates a schematic of an embodiment of a submerged conduit with a buoyancy module attached.

Clamp tool 40 may be unsecured from submerged conduit 10 by removing securing straps 95, adjusting flotation devices 16 and/or adjusting slack in crane 42. In some embodiments, clamp tool 40 may be returned to vessel 44 with crane 42. Vessel heave and sea conditions may be taken into account when deploying or removing clamp tool 40. FIG. 3E illustrates a schematic of an embodiment of a submerged conduit with buoyancy modules 30 attached to submerged conduit 10 after removal of clamp tool 40.

Figure 4:
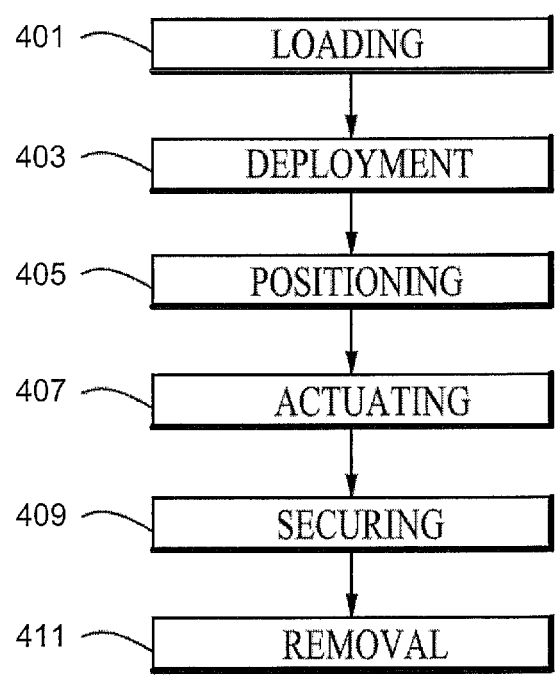
FIG. 4 illustrates a flowchart of an embodiment of a method to install buoyancy modules onto submerged conduits.

FIG. 4 illustrates a flowchart of an embodiment of a method to install buoyancy module 30 onto submerged conduit 10. Loading step 401 comprises loading some or all sections of buoyancy module 30 in clamp tool 40. In some embodiments, one section of buoyancy module 30 is secured to first plate 50, and third plate 54, and one section of buoyancy module 30 is secured to second plate 52 and fourth plate 56 (for example, FIG. 2E). In certain embodiments, sections of buoyancy module 30 are secured to connecting bars 60 and 62. In certain embodiments, loading step 401 occurs on deck of vessel 44. In some embodiments, loading step 401 includes actuating clamp tool 40 into a closed configuration. Clamp tool 40 may be actuated closed with rams 72 and/or pump(s). Loading step 401 may also include considering whether sea conditions are appropriate, securing the clamp hydraulics or pump system, securing retaining straps, (for example, connecting straps 100, around buoyancy module 30 and/or clamp tool 40), securing fasteners 84, and/or attaching strap com-a-longs to clamp tool 40. In certain embodiments, once loaded, clamp tool 40 may be deployed.

Deployment step 403 may include securing clamp tool 40 to crane 42 using riggings, slings and/or chain com-a-longs. In deployment step 403, clamp tool 40 may be submerged below water surface 18 and placed proximate to submerged conduit 10. In some embodiments, deployment step 403 may include deploying a remotely operated vehicle or divers to guide clamp tool 40 into position.

Clamp tool 40 may then be positioned at the installation or removal location in positioning step 405. Positioning step 405 may include activating the hydraulic or air pump system and actuating the clamp into an open configuration. In some embodiments, clamp tool 40 may be actuated open by a diver operating control panel 76, which may be coupled to rams 72 and/or pump(s). In other embodiments, clamp tool 40 may be actuated open by personnel on vessel 44 monitoring clamp tool operations using a remotely operated vehicle. In certain embodiments, the hydraulic or air pump system may be activated on vessel 44. In some embodiments, clamp tool 40 may be in an open configuration prior to positioning step 405 and/or prior to deployment step 403. Positioning step 405 may also include securing clamp tool 40 to submerged conduit 10, for example using chains and/or securing straps 95. In some embodiments, positioning step 405 may occur wholly or partially while clamp tool 40 is in a closed configuration. For example, FIG. 3A shows one embodiment of clamp tool 40 positioned proximate to submerged conduit 10. Once positioned, clamp tool 40 maybe actuated closed on or around submerged conduit 10 in actuating step 407. In actuating step 407, the air or hydraulic pump system may be activated topside on vessel 44. In certain embodiments, the air or hydraulic pump system may be activated remotely or by a diver. Clamp tool 40 may be actuated closed by operation of manifold valves 78 on control panel 76. For example, FIG. 3B illustrates a schematic of an embodiment of a clamp tool positioned around a submerged conduit. In some embodiments, when closed, clamp tool 40 may be secured to submerged conduit 10. For example, secured using connecting straps 100 as shown in FIG. 3C. Buoyancy module 30 may then be installed on submerged conduit 10.

In securing step 409, buoyancy module 30 may be secured to submerged conduit 10. Connecting straps 100, chains, or other securing means well known to those of skill in the art may be used to secure buoyancy module 30 to submerged conduit 10. Fasteners 84 connecting buoyancy module 30 to submerged conduit 10 may then be removed. Clamp tool 40 may then be removed in removal step 411. Clamp tool 40 may be actuated open and/or outward by operation of one or more manifold valves 78 on control panel 76, which may activate rams 72. Air in the flotation devices 16 may be adjusted during removal step 411. In some embodiments, straps and/or chains securing clamp tool 40 to submerged conduit 10, such as securing straps 95, may also be removed. FIG. 3D illustrates a schematic of an embodiment of a clamp tool being released from a submerged conduit after attachment of a buoyancy module. Clamp tool 40 may then be returned to the deck of vessel 44 or to a storage location.

Those of skill in the art will appreciate that buoyancy module 30 may also be removed from submerged conduit 10 using the methods and systems described herein by adjusting the order of the embodiments appropriately.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. In addition, it is to be understood that features described herein independently may, in certain embodiments, be combined.

The invention claimed is:

1. A method for subsea installation of a floatable buoyancy module to a submerged conduit to increase a buoyancy of the submerged conduit, comprising:
    loading a floatable buoyancy module on a clamp tool, the clamp tool comprising a first plate pivotably coupled to a second late and a telescoping member extending between the first plate and a third plate, the loading comprising at least one of extending or retracting the telescoping member to adjust a width of the clamp tool;
    submerging the loaded clamp tool proximate to a submerged conduit;
    actuating the loaded clamp tool around the submerged conduit, the actuating comprising pivoting the first plate towards the second plate;
    securing the floatable buoyancy module to the submerged conduit; and
    releasing the clamp tool from the secured buoyancy module, the releasing comprising:
        extending the telescoping member to increase the width of the clamp tool; and
        pivoting the first plate and the second plate apart.

2. The method of claim 1, wherein actuating the clamp tool comprises using a hydraulic ram.

3. The method of claim 1, wherein actuating the clamp tool comprises using an air actuated pump system, the air actuated system comprising a ram, pump and hose, and wherein the method further comprises adjusting a buoyancy of the loaded clamp tool with air in the hose.

4. The method of claim 3, further comprising operating the clamp tool using a control panel coupled to the clamp tool by the hose.

5. The method of claim 4, wherein the control panel is located remotely.

6. The method of claim 1, wherein the buoyancy module is secured to the submerged conduit with a connecting strap.

7. The method of claim 1, wherein the clamp tool comprises at least four plates and a second telescoping member extending between the second plate and a fourth plate, and releasing the clamp tool comprises extending the first and second telescoping members.

8. The method of claim 1, wherein the buoyancy module is loaded on the clamp tool using a removable fastening.

9. The method of claim 1, wherein the clamp tool is submerged proximate to the submerged conduit using a crane.

10. The method of claim 9, wherein the crane is located on a vessel.

11. The method of claim 1, wherein the clamp tool further comprises an installed floatation device and the method further comprises inflating the floatation device at the submerged location to bring the loaded clamp tool to a neutral buoyancy point.

12. A method for subsea removal of a buoyancy module having a positive buoyancy from a submerged conduit, comprising:
    positioning an unloaded clamp tool under water proximate a submerged conduit, wherein the submerged conduit comprises a buoyancy module having a positive buoyancy;
    actuating the unloaded clamp tool around the buoyancy module, the actuating comprising:
        retracting a width of the clamp tool using a plurality of telescoping members; and
        hinging the clamp tool closed;
    securing the buoyancy module to the clamp tool thereby loading the buoyancy module on the clamp tool; and
    hinging the clamp tool with secured buoyancy module open to remove the clamp tool with secured buoyancy module from the submerged conduit.

13. A method for installation of a floatable buoyancy module onto a submerged conduit to increase a buoyancy of the submerged conduit, comprising:
    submerging a clamp tool loaded with a floatable buoyancy module proximate a portion of a submerged conduit, the clamp tool comprising at least three plates, a telescoping member moveably coupling a first plate of the at least three plates to a second plate of the at least three plates, and an actuating means;
    actuating the loaded clamp tool around the portion of the submerged conduit using the actuating means;
    securing the floatable buoyancy module to the submerged conduit; and
    removing the clamp tool from the floatable buoyancy module, the removing comprising:
        extending a width of the clamp tool by telescoping the first plate apart from the second plate; and
        pivoting a third plate apart from the first plate to open the clamp tool.

14. The method of claim 13, wherein the floatable buoyancy module maintains the portion of the submerged conduit in a catenary configuration.

15. The method of claim 13, wherein the floatable buoyancy module maintains the portion of the submerged conduit in an S-shape.

16. The method of claim 13, wherein the clamp tool comprises four plates, and extending the width of the clamp tool further comprises moving the first plate and the third plate along a rod until reaching a stopping member.

17. The method of claim 13, wherein the clamp tool comprises a floatation means and the method further comprises adjusting a buoyancy of the submerged clamp tool to facilitate subsea movement using the floatation means inflated after the clamp tool is submerged.

18. A method for subsea installation of a buoyancy module onto a submerged conduit comprising:
   loading a buoyancy module in a clamp tool while the clamp tool is located on a vessel, wherein the clamp tool comprises:
      a first plate pivotably coupled to a second plate;
      a third plate pivotably coupled to a fourth plate;
      the first plate telescopedly coupled to the third plate with a first telescoping member;
      the second plate telescopedly coupled to the fourth plate with a second telescoping member; and
      wherein the loading comprises at least one of extending or retracting the first and second telescoping members to adjust a width of the clamp tool;
   submerging the loaded clamp tool underwater proximate to a submerged conduit;
   actuating the loaded clamp tool around the submerged conduit, wherein the actuating comprises:
      pivoting the first plate towards the second plate; and
      pivoting the third plate towards the fourth plate;
   securing the buoyancy module to the submerged conduit; and
   releasing the clamp tool from the secured buoyancy module, the releasing comprising:
      extending the first and second telescoping members to increase the width of the clamp tool;
      pivoting the first plate apart from the second plate; and
      pivoting the third plate apart from the second plate.

* * * * *